United States Patent [19]

Quintin

[11] Patent Number: 5,068,875
[45] Date of Patent: Nov. 26, 1991

[54] ADAPTIVE LOOP GAIN PHASE FILTER

[75] Inventor: Michel Quintin, La Gaude, France

[73] Assignee: International Business Machines Corp., Armonk, N.Y.

[21] Appl. No.: 401,679

[22] Filed: Sep. 1, 1989

[30] Foreign Application Priority Data

Aug. 16, 1989 [EP]  European Pat. Off. ........ 89480127.3

[51] Int. Cl.⁵ ........................ H04L 25/03; H04B 3/14
[52] U.S. Cl. ....................................... 375/78; 375/118; 375/14; 375/97; 364/724.19; 364/724.2
[58] Field of Search .................... 375/12, 14, 97, 78, 375/118; 328/55, 155; 364/724.01, 724.19, 724.2

[56] References Cited

U.S. PATENT DOCUMENTS

| | | | |
|---|---|---|---|
| 4,386,430 | 5/1983 | Trieber | 375/14 |
| 4,394,760 | 7/1983 | Sari | 375/14 |
| 4,580,275 | 4/1986 | Pirani et al. | 364/724.2 X |
| 4,701,873 | 10/1987 | Schenk | 364/724.2 |
| 4,773,034 | 9/1988 | Debus, Jr. | 364/724.2 |
| 4,789,952 | 12/1988 | Lo et al. | 364/724.2 |
| 4,847,864 | 7/1989 | Cupo | 375/14 |

Primary Examiner—Douglas W. Olms
Assistant Examiner—Ralph Smith
Attorney, Agent, or Firm—Edward H. Duffield

[57] ABSTRACT

The adaptive loop gain phase filter of the invention utilizes an averaged value of the phase error at each baud time instead of the phase error for generating the value of the frequency shift. Such an averaged value is obtained by accumulating in accumulator ACCU2 (34) the phase error at each baud time after multiplying it by a factor $K_O$, and is provided either very M baud time when a counter (38) preset at M reaches O, or if the contents of accumulator (34) reach a predetermined limit value. The value of the frequency shift which is accumulated in accumulator ACCU1 (14) is every accurate and enables the phase disturbance such as line breaks and phase hits to be overcome.

6 Claims, 2 Drawing Sheets

ADAPTIVE LOOP GAIN PHASE FILTER

TECHNICAL FIELD

The present invention relates to modems, and relates particularly to an adaptive loop gain phase filter used in a modem receiver, enabling the line breaks and the phase hits to be handled.

BACKGROUND ART

In the transmission of data between a first Data Terminal Equipment (DTE) and a second DTE over telephone lines, each DTE is equipped with a modem wherein a carrier signal is modulated by the data in a modulator at the transmitting end and demodulated in a demodulator at the receiving end.

In the today modems, the data bit stream received from the DTE at the input of the modem is loaded in a serializer/deserializer which provides parallel groups of bits, the number of bits in each group depending on the data bit rate of the modem. Each group is converted to a point in a phase-amplitude diagram, all the points of the diagram forming a constellation. Each point is then translated into a couple of values corresponding to the coordinates of the point. The technique for coding the points of the constellation is described in the article entitled "Multidimensional Signal Constellations for Voice-band Data Transmission" by A. Gersho and V. Lawrence, published in IEEE JOurnal of Selected Area in Communications, vol. SAC-2, Nov. 5, 1984.

Then, these two quadrature signal values are modulated by a carrier signal before being spectrally shaped in a filter centered at the carrier frequency providing as an output a number of samples of the shaped signal each baud samples are provided to a digital-to-analog converter in order to be converted into an analog signal to be sent over the telephone line.

Reciprocally, on the other direction, the analog signal received from the telephone line is first converted into digital samples. The samples are filtered, and the output of the filter representing two in-phase and quadrature components, are used to provide a point in the plane corresponding to a group of bits. The juxtaposed groups of bits are then serially transmitted to the DTE.

Whatever be the type of telephone lines used, leased lines or public lines of the switched telephone network, the carrier signal is often affected by a frequency shift. Indeed, the signal can be frequency switched one or more times in the equipments of the telephone network. As these equipments are not sufficiently interdependent, the signal which is received by the modem receiver is no longer maintained at the carrier frequency of the transmitting modem. As a consequence, such a frequency shift, which can be of about from 0,1 Hz to 6 Hz, results in a phase variation at each baud time which has to be taken into account by a phase filter incorporated in the modem receiver.

The phase filters, used in the today modems such as the IBM modem 5866 are of the second-order loop type wherein the frequency shift is first computed by accumulating the phase error evaluated every baud time, and then the phase correction to be added to the modem equalizer output to compensate for the frequency shift is computed at each baud time by an updating of the phase correction of the preceding baud obtained from a combination of the current value of the frequency shift and the current value of the phase error. Such phase filters enable the frequency shift and the resulting phase correction to be computed with an accuracy sufficient for transmission rates not greater than 14 400 bits/s. But, with a rate as high as 19 200 bits/s, the accuracy provided by the existing phase filters does not enable problems raised by phase disturbances to be solved.

Such phase disturbances are principally due to line breaks and phase hits. A line break consists in a drop of energy of the signal received by the modem. During a line break, the modem switches to a mode of operation where it expects a synchronization signal. Nothing allows the modem to distinguish between a line break and a normal end of transmission. It is only when the energy is detected at the receiver input within the modem receive range that the modem can know that it was a line break. In such a case, it is necessary that the value of the phase correction be identical to what it would have been in case no energy drop occurred. Such a condition can be reached only if the value of the frequency shift which has been saved just before the line break is sufficiently accurate. If not, the error in the value of the frequency shift leads to an error in the value of the phase correction which rapidly exceeds a value of some degrees (5 degrees for a 99 200 bits/s modem) for which the modem is no longer able to get proper decoding decisions.

Another phase disturbance occurs in case of a phase hit which happens on the telephone line. If such a phase hit is higher than a value of some degrees (always 5 degrees for a 19 200 bits/s modem), the value of the phase correction at the output of the phase filter is suddenly off the correct setting due to the value of the phase hit. The modem becomes unable to provide significant errors that would drive the phase filter towards the correct phase correction. The decoded decisions are random and many high amplitude errors occur, which result in a high mean-square error.

SUMMARY OF THE INVENTION

Therefore the object of the invention is an improved modem phase filter which provides an accurate value of the frequency shift.

Another object of the invention is an improved modem phase filter providing an accurate value of frequency shift and therefore of the phase correction enabling the phase disturbances such as line breaks and phase hits to be overcome.

These objects and others are provided by an adaptive loop gain phase filter of the type wherein the phase correction to be applied to the received signal at each baud time results from the sum of a fraction of the value of the frequency shift, a fraction of the phase error and the value of the phase correction at the preceding baud time. In the phase filter of the invention, the phase error is not directly used for obtaining the value of the frequency shift but is replaced by an averaged value of this phase error. Such an averaged value is provided, at each baud time, by first accumulating means in response to the value of the phase error multiplied by a factor $K_0$, the contents of the accumulating means being provided to second accumulating means in charge of providing the value of the frequency shift, in response to either the detection that the contents of the first accumulating means have reached a predetermined limit value, or a periodic gating pulse provided every predetermined number of baud times.

The adaptive loop gain phase filter of the invention provides a very accurate value of the frequency shift which enables a phase hit to be dealt with a method consisting in saving the value of the frequency shift computed just before the phase hit occurs, phase rotating the received signal by a slowly incremented angle to determine the value of the phase correction for which the mean square error presents a minimum, computing the phase correction during the phase rotating by using the value of the frequency shift being saved, so that the phase correction is continually determined as if no phase hit has occurred, and adding to the value of the phase correction, the value of the slowly incremented angle for which the mean-square error presented a minimum.

BRIEF DESCRIPTION OF THE DRAWINGS

The foregoing and other objects will be more fully described in reference to the accompanying drawings wherein.

DESCRIPTION OF THE PREFERRED EMBODIMENT

Figure 1:
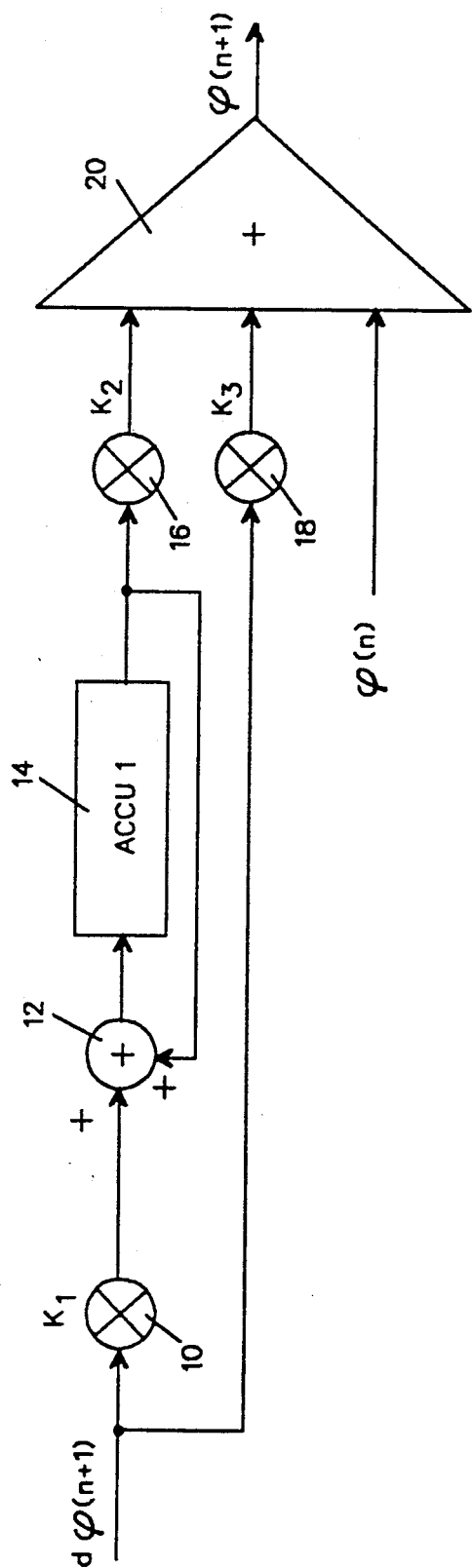
FIG. 1 depicts a block diagram of the phase filter used in the prior modems.

FIG. 1 shows the block diagram of a phase filter used in today high speed modems such as IBM modem 5866 operating at 14 400 bits/s.

d is a value representative of the phase error evaluated every baud time by the receiver in normal data mode. It corresponds to the phase difference between the point of the constellation which has been estimated after data decoding, and the received point of the complex plane. This value is function of the frequency shift, and also function of the noise which pollutes the data signal. As shown on the Figure, the phase error d is first multiplied by a factor $K_1$ in multiplier 10, before being summed, in adder 12, with the output of accumulator 14.

The value of factor $K_1$ is chosen so as to obtain the value of the frequency shift FS in accumulator 14 according to equation:

$$FS(n) = FS(n-1) + K_1 \cdot d(n) \quad (1)$$

where FS(n−1) is the frequency shift at baud time n−1 and FS(n) is the frequency shift at baud time n.

Then, the value of the phase correction to be added to the equalizer output to compensate for the frequency shift and eventual phase intercept, is obtained by summing, in adder 20, the frequency shift multiplied by factor $K_2$, in multiplier 16, the phase error multiplied by factor $K_3$ in multiplier 18, and the value of the phase correction at the preceding baud time:

$$(n+1) = (n) + K_2 \cdot FS(n) + K_3 \cdot d(n+1) \quad (2)$$

As already mentioned, such a phase filter which is suitable for modems operating at low speed, does not compute a value of the frequency shift sufficiently precise to obviate phase disturbances such as line breaks or phase hits occurring in a high speed modem such as a 19 200 bps modem.

Figure 2:
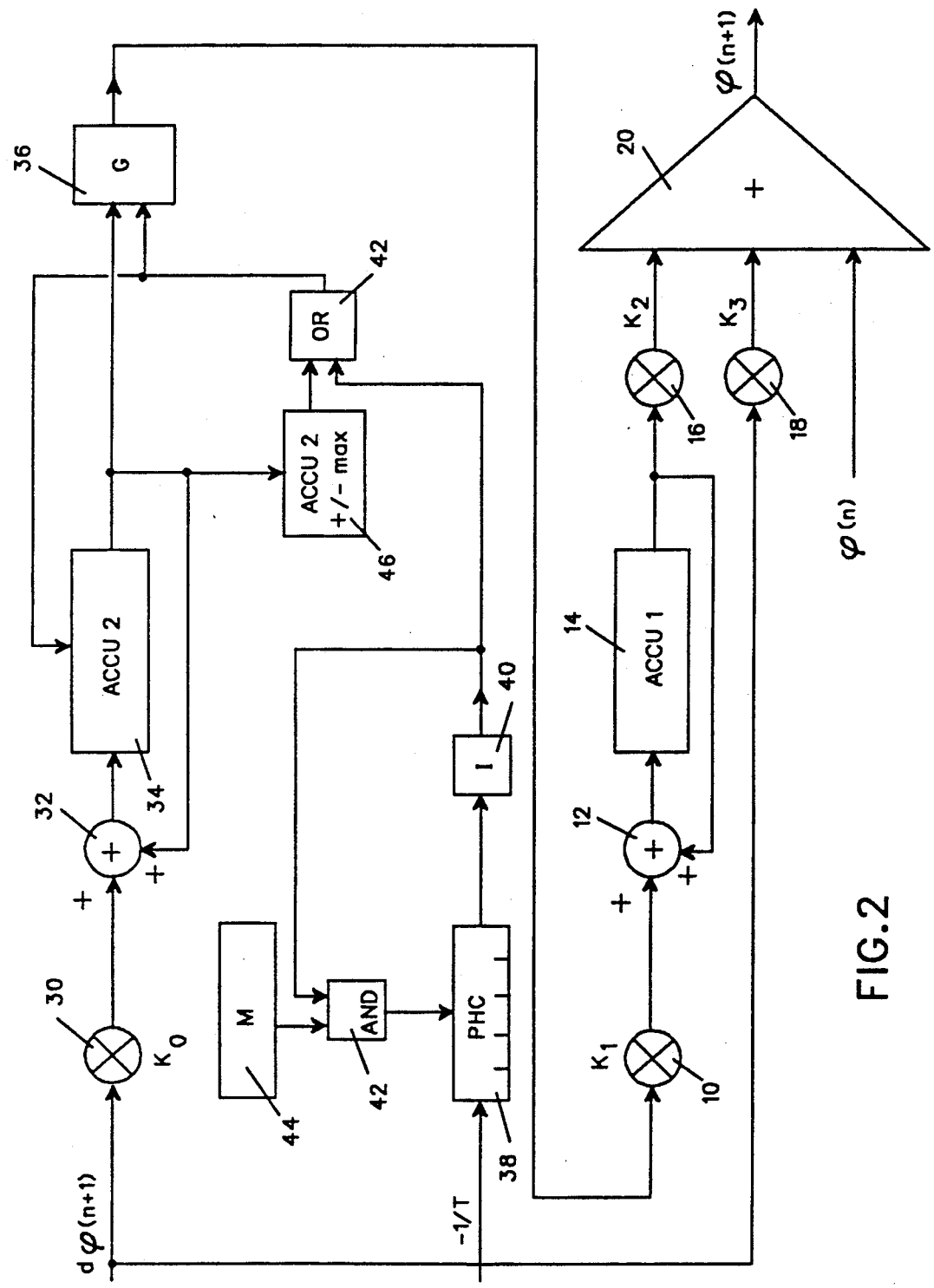
FIG. 2 depicts a block diagram of the adaptive loop gain phase filter according to the present invention.

A phase filter according to the invention, which obviates the drawbacks caused by phase disturbances is now described in reference to FIG. 2. The latter Figure incorporates the block-diagram shown on FIG. 1 with the same reference numbers as on the latter Figure. The input of multiplier 10 (factor $K_1$) is no longer d, but an averaged value of d as described now in detail.

First, the incoming phase error d is multiplied by factor $K_0$ in multiplier 30, then summed in adder 32 with the output of accumulator 34 (ACCU2). Thus, the phase error d is accumulated in ACCU2 after weighting by factor $K_0$.

The value of the accumulator 34 is then provided to the input of multiplier $K_1$ by means of gate 36 according to two ways. In a first way, phase counter (PHC) 38 controls the number of baud times during which the phase errors d are accumulated in accumulator 34. Phase counter 38, which is initially set to a value M, is decremented by 1 at each baud time. As long as the value of phase counter 38 is different from 0, the products $K_0 \cdot d$ are accumulated in accumulator 34. When counter 38 reaches 0, inverter 40 provides a bit 1 to OR circuit 42 which conditions gate 36. Therefore, the contents of accumulator 34 are transferred to the input of multiplier $K_1$, and processed in the same manner as the phase error d in FIG. 1. When the value of phase counter 38 is 0, inverter 40 also provides a bit 1 at the input of AND circuit 42, which enables the phase counter to be set again with a value M contained in register 44.

In the second way, the accumulated value in accumulator 34 is monitored by detector 46. When the value of ACCU2 reaches a value equal to plus or minus a fixed maximum value, detector 46 sends a pulse to OR circuit 42 and to gate 36 so that the value of accumulator 34 can be transferred to multiplier $K_1$. It must be noted that, in both ways, the pulse at the output of OR circuit 42 is used to reset the contents of accumulator 34. Accordingly, it can be easily understood that, if counter 38 is set to 0 after each transfer, a new transfer of the accumulator 32 contents occurs at each baud time, and the operation of the phase filter comes down to the operation of the phase filter described on FIG. 1.

The phase filter of the invention, thanks to the averaging function of the phase error, combining the parameters of time (resetting of the phase counter) and of magnitude (detection of a predetermined value), allows to accumulate the phase errors with a high input gain. Besides, very small errors are contributing to the value of ACCU2 and the overall loop gain is maintained.

The updating formula for the frequency shift FS accumulated in accumulator 14 (ACCU1) becomes:

$$FS = K_1 \cdot \sum_0^{M-1} K_0 \cdot d_n$$

where an averaging effect is produced, having factor $K_1$ proportional to $1/M$.

When entering data mode M is chosen of the order of 100, $K_1$ is equal to ½ and $K_0$ is equal to 1/16. Then, $K_1$ is decreased in several steps to its minimal value, around 1/1000 while M is increased up to 1000, which allows to acquire rapidly the steady state value of the frequency shift.

As already mentioned, the value of the frequency shift obtained in the prior art modems operating at rates not higher than 14 400 bps is determined with a sufficient accuracy. But, the accuracy is not at all sufficient to overcome the phase disturbances which can happen in modem operating at 19 200 bps. Thus, with registers of 16 bit capacity corresponding to the today capacity of the present signal processors, a phase value difference of 360° is associated to the full capacity that is 65,536 (decimal value). That means that the lowest variation of the output register contents, that is one bit, can be detected only with a phase variation higher than $3.10^{-3}$ degree at each baud time, which corresponds to an error in the frequency shift as higher as 0,02 Hz. It is clear that the improved smaller phase filter of the invention enables much smaller errors in the frequency shift to be dealt with. This accuracy imposes to use a 32-bit representation of the phase correction together with a 32-bit output register (not represented on FIG. 2).

The test of the maximum value of ACCU2 by detector 46 enables the slow variations of the frequency shift to be tracked, its effect contributing to have an adaptive loop gain of the phase filter.

Without the invention, and assuming that $K_1$ is chosen equal to 1/32, the noise effect is divided by 32. With the phase filter of FIG. 2, at least 100 samples of the centered noise value are added together before modifying the value of ACCU1. The noise effect is statistically reduced by the addition, before multiplication, by factor $K_1$.

The circuit according to the invention, as described above, provides a very accurate value of the frequency shift which enables the phase disturbances such as line breaks or phase hits to be overcome.

As explained above, a line break consists in a drop of the energy of the signal received by the modem. During a line break, it is clear that no more phase error d is meaning ful or available. Therefore, the value of the frequency shift ACCU1 (see FIG. 2) is kept as it was when the energy dropped. But, the value of the phase correction is still being computed on during the time of the line break, the open loop using the fixed value of the frequency shift (ACCU1).

Equation (2) becomes:

$$(n+1) = (n) + K_2 \cdot FS$$

When energy is again detected at the receiver input, the phase correction is identical to what it would have been in case no line break occurred. The very stable value of frequency shift obtained with the phase filter of the present invention allows to handle line breaks of several seconds without exceeding a phase difference of about 5 degrees which would be detrimental for the modem to correctly decode the received signal.

A second open-loop node for operation of the phase filter according to the invention, is used after a phase hit. In case of phase hit higher than some degrees (5 degrees for a 19,200 bps modem), the value of the phase correction is suddenly off the correct setting by HIT degrees. The modem is unable to provide significant errors that would drive the phase filter towards an expected value $-HIT$.

The solution consists in rotating the equalizer output value by a slowly incremented angle in order to determine whether there exists a particular value of the phase correction for which the mean square error presents a minimum. Again, as for a line break, the value of the frequency shift which has been saved before the phase hit occurs, is used. The process can be represented by equations:

$$(n) = (n-1) + K_2 \cdot FS + (n) \quad (3)$$

$$(n+1) = (n) + INC \quad (4)$$

Then, the value of for which the mean-square error presented a minimum is added to the current phase correction, the modem having the best possible phase setting to recover.

The phase scanning must be slow enough to cope with the mean-square integration constant.

A time of 3 or 4 seconds is necessary to scan from 0 to 180 degrees. Again, the accurate value of the frequency shift obtained with the phase filter of the invention allows that the phase correction to be applied does not exceed a critical value (about 5 degrees) during this scanning time.

Though a preferred embodiment of the invention has been shown in reference to a functional block diagram, it will be understood by those skilled in the art that the invention can be implemented in hardwired logic circuit as well as in microcode controlling a signal processor, and that changes may be made to this embodiment without departing from the spirit and scope of the invention.

I claim:

1. Adaptive loop gain phase filter in a combined amplitude-and-phase-modulation modem wherein a shift of the frequency of the signal carrier creates a phase error that requires a phase correction of the received signal at each baud time, said filter comprising:
   first accumulating means (34) for providing at baud time n+1, an averaged value of said phase error, from the phase error at baud time n+1 multiplied by a first factor $K_0$:
   detecting means (46) connected to said first accumulating means for detecting when the contents of said accumulating means reach a predetermined limit value;
   counting means (38) for providing a periodic pulse ever M baud time;
   gating means (36) connected to said first accumulating means, to said counting means and to said detecting means for outputting the content of said accumulating means in response to either the detection by said detecting means of said predetermined limit value, or to said periodic pulse provided by said counting means;
   second accumulating means (14) connected to said gating means for providing the value of the frequency shift in response to said averaged value of said phase error multiplied by a second factor ($K_1$) when said gating means are enabled; and
   summing means (20) connected to said second accumulating means for providing the phase correction to be applied to the received signal at baud time n+1 in response to said value of frequency shift multiplied by a third factor ($K_2$, said phase error at baud time n+1 multiplied by a fourth factor ($K_3$) and the value of the phase correction at baud time n.

2. Phase filter according to claim 1 wherein said counting means (38) comprise a counter which is preset to a value M and decremented at each baud time, a gating pulse being provided when the contents of said counter reach 0 for enabling said gating means (36) and presetting again said counter to the value M.

3. Phase filter according to claim 1 or 2 wherein M is of the order of 1000 and factor $K_1$ is around 1/1000.

4. Phase filter according to claim 3 wherein factor $K_0$ is 1/16.

5. Phase filter according to claim 4 wherein, when the modem starts operating in data mode, factor $K_1$ is decreased from an initial value such as ½ to its final value while M is increased from an initial value such as 100 to its final value, thereby allowing to acquire more quickly the steady state of the modem.

6. Method of compensating a phase hit in a combined amplitude-and-phase-modulation modem comprising a phase filter providing a very accurate value of the frequency shift, said method comprising the steps of:

saving the value of frequency shift last computed just prior to the occurrence of a phase hit;

detecting a phase hit;

phase rotating the received signal by a slowly incremented angle to determine the value of the phase correction for which the mean-square error presents a minimum;

computing the phase correction during the phase rotating by using the value of the frequency shift being saved, so that said phase correction is continually determined as if no phase hit has occurred; and adding to said continually determined value of the phase correction, the value of said slowly incremented angle for which the mean-square error presented a minimum.

* * * * *